United States Patent
Dieterich et al.

[15] 3,689,496
[45] Sept. 5, 1972

[54] MANUFACTURE OF DIALKYL PYRIDINES

[72] Inventors: Dieter Dieterich; Rudolf Braden, both of Leverkusen, Germany

[73] Assignee: Farbenfabrik Bayer Aktiengesellschaft, Leverkusen, Germany

[22] Filed: Aug. 13, 1969

[21] Appl. No.: 849,919

[30] Foreign Application Priority Data

Aug. 27, 1968 Germany..........P 17 95 239.5

[52] U.S. Cl................................................260/290 P
[51] Int. Cl................................................C07d 31/02

[58] Field of Search......................................260/290

[56] References Cited

UNITED STATES PATENTS 2,780,627   2/1957   MacLean et al...........260/290

Primary Examiner—Henry R. Jiles
Assistant Examiner—Harry I. Moatz
Attorney—Burgess, Dinklage & Sprung

[57] ABSTRACT

Alkyl pyridines are manufactured by reacting R—C(CH$_2$OH)$_3$ (a trimethylolalkane) with ammonia or an amine, preferably in the presence of a polar solvent (water) and an acid catalyst.

6 Claims, No Drawings

MANUFACTURE OF DIALKYL PYRIDINES

This invention relates to a process for the production of dialkyl pyridines, optionally in addition to aminopropanols.

It is known that 3,5-dialkyl pyridines, particularly 3,5-dimethyl pyridine, can be prepared by any one of a number of syntheses, all of which lead unfortunately to mixtures of pyridine derivatives from which the pure 3,5-dialkyl pyridines are extremely difficult to isolate, because they cannot be separated by distillation. Pure starting materials are, however, required for preparative syntheses based on 3,5-dialkyl pyridines.

It has now been found that 3,5-dialkylpyridines are surprisingly formed during the reaction of 1,1,1-trimethylol alkanes with ammonia, or amines such as methylamine or dimethylamine at temperatures above 180°C.

The present invention, therefore, provides a process for the production of dialkyl pyridines, optionally in addition to amino propanols, in which a 1,1,1-trimethylol alkane corresponding to the general formula

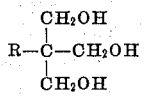

in which R represents an optionally substituted linear or branched alkyl radical, is reacted with at least half the equimolar quantity of ammonia and/or an amine at a temperature of from 180° to 600°C, and preferably from 240° to 400°C optionally in the presence both of a polar solvent and of an acid catalyst and optionally under pressure.

The radical R in the 1,1,1-trimethylol compounds used as starting materials is a saturated linear or branched aliphatic radical with preferably from one to 12 carbon atoms. Possible substituents for the radical R include in particular —F, —Cl, —OH, —SH, —SO₃H, —CN, —OCH₃, —OC₂H₅, —OC₆H₅, and also the phenyl radical which may also contain one or more of the aforementioned substituents.

It is, however, particularly preferred to use trimethylol compounds wherein the radical R represents an unsubstituted alkyl radical and in particular an unbranched alkyl radical with from one to five carbon atoms, for example 1,1,1-trimethylol ethane; 1,1,1-trimethylol propane; pentaerythritol; 1,1,1-trimethylol butane; 1,1,1-trimethylol pentane; 1,1,1-trimethylol hexane; 1,1,1-trimethylol heptane; 1,1,1-trimethylol octane; 1,1,1-trimethyl-2-methyl propane; 1,1,1-trimethyl-2,2-dimethyl propane; 1,1,1-trimethylol-2,4,4-trimethyl butane; or 1,1,1-trimethylol-3-methyl butane.

Ammonia, methylamine or dimethylamine is preferably used as the amine component, generally in a quantity of from 0.5 to 20 (preferably from 0.8 to 8) mols per mol of 1,1,1-trimethylol alkane. Mixtures of the aforementioned amines in any ratio may of course also be used.

Due to the volatility of the amines used, the reaction is preferably carried out under pressure. The reaction time is normally from 1 to 20 (preferably from 3 to 12) hours, depending upon the other reaction conditions. The higher the reaction temperature, the shorter will be the reaction times. The reaction components may be contacted in any order.

A mixture of the reaction components prepared at room temperature may be heated to the required temperature, or alternatively the amine component may be introduced into a suitable reaction vessel and the 1,1,1-trimethylol alkane can be added to it at elevated temperature. If the process is carried out batchwise, the 1,1,1-trimethylol alkane is preferably introduced together with ammonium chloride or ammonium bromide, and optionally a solvent, ammonia is introduced under pressure and the mixture is heated.

Since 3,5-dialkyl pyridines are thermally stable up to temperatures above 500°C, the process according to the invention may also be carried out continuously and at normal pressure. For example, the reaction mixture may be introduced into a hot reactor in the form either of a liquid or of a gas, as a result of which the heating time is reduced to fractions of a second. In this connection, it is preferred to operate at a temperature in the range from 300° to 600°C. For example, an ammonia, methylamine or dimethylamine atmosphere may be maintained in the reaction zone and the 1,1,1-trimethylol alkane can be introduced into it. After they have issued from the reactor, the reaction products are condensed and any unreacted ammonia or amine recycled.

The reaction may be carried out in the absence of catalysts, although it is of advantage to use acid catalysts with a pKs-value of less than 6 (preferably less than 3.0).

A variety of acid catalysts may be used, including, for example, sulphuric acid, hydrochloric acid, hydrobromic acid, hydriodic acid, perchloric acid, arsenic acid, pyrophosphoric acid, ammonium chloride, benzene sulphonic acid, o-aminobenzene sulphonic acid, picric acid, naphthalene sulphonic acid, o-nitrobenzoic acid, dichloroacetic acid, trichloroacetic acid, formic acid, lactic acid, acetic acid, trichlorophenol, oxalic acid, succinic acid, phosphoric acid and phosphorous acid. The catalysts according to the invention may of course also be used in the form of their ammonium or amine salts. They are normally used in a concentration of from 0.05 to 0.8 (preferably from 0.05 to 0.5) mol per mol of amine. Very weak acids such as carbonic acid can reduce the yield.

The catalysts may be homogeneously dissolved in the reaction mixture, although they may also be used adsorbed on supports, for example active carbon or silica, for example when the reaction is carried out in the gas phase.

Although solvents may be present, they are not absolutely necessary. It is preferred to use polar solvents, in particular water or methanol. Thus, ammonia and low-boiling amines are frequently used in the form of aqueous solutions. The quantity in which the solvent is used should, if possible, not exceed the quantity in which the reactants are present.

Following removal of readily volatile components, the dialkyl pyridines may be separated from the reaction products either by distillation or by extraction. Separation by steam distillation is of particular advantage when preparing diethyl pyridine and the higher homologues. The reaction of 1,1,1-trimethylol propane and ammonia in the presence of ammonium chloride to form 3,5-diethyl pyridine, which may be carried out batchwise under pressure or continuously at normal pressure or at elevated pressure, is particularly preferred according to the present invention. For this purpose, a concentrated aqueous solution containing 1,1,1-trimethylol propane and ammonium chloride is simply reacted with ammonia, in a preferred embodiment. 1,1,1-trimethylol propane may also be used in the form of the commercial, i.e. 60 to 90 percent crude product.

The synthesis of 3,5-lutidine and the dinicotinic acid readily obtainable therefrom, from trimethylol ethane is also of significance.

Symmetrical 3,5-dialkyl pyridines are used as solvents, catalysts and co-catalysts, optionally in the form of their complex salts, and as intermediates in the synthesis of plant-protection agents, dyes and pharmaceutical products and in the preparation of starting materials for temperature-resistant polymers.

3,5-diethyl pyridine is suitable for the synthesis of 3-ethyl-5-vinylpyridine and 3,5-divinylpyridine.

EXAMPLE 1

134 g (1 mol) of 1,1,1-trimethylol propane and 680 g of 25 percent by weight aqueous ammonia solution (corresponding to 10 mols of $NH_3$) are heated for 10 hours at 270°C in an autoclave. The upper layer formed is 3,5-diethyl pyridine. The product is purified by extraction with petroleum ether, drying over potassium hydroxide and distilling off the solvent. Yield approximately 7 g (10 percent of the theoretical).

EXAMPLE 2

134 g (1 mol) of 1,1,1-trimethylol propane and 100 g of water are introduced into an autoclave, followed by the introduction under pressure of 170 g (10 mols) of ammonia. After heating for 10 hours at 270°C and working-up as described above, 3,5-dimethyl pyridine is obtained in a yield of approximately 9 g (13 percent of the theoretical).

EXAMPLE 3

The procedure is as described in example 2, except that 40 g. of ammonium a cetate are added. 3,5-diethyl pyridine is obtained in a yield of 15 g (22 percent of the theoretical).

EXAMPLE 4

The procedure is as described in example 2, except that 50 g of ammonium carbonate are added, and methanol (100 g) is used as the solvent instead of water. The yield of 3,5-diethyl pyridine comprises 7 percent of the theoretical and 9 percent where water is used as the solvent.

EXAMPLE 5

670 g (5 mols) of 1,1,1-trimethylol propane, 200 g of water and 200 g of ammonium chloride are introduced into an autoclave, followed by the introduction under pressure of 255 g (15 mols) of ammonia. After reaction for 10 hours at 290°C, the reaction mixture is made alkaline with 200 g of 50 percent by weight sodium hydroxide solution, and steam-distilled at a bath temperature of 140°C. The upper pale yellow layer formed is separated off and dried over potassium hydroxide. The crude yield is 206 g (61 percent of the theoretical). Distillation gives 128 g (38 percent of the theoretical) of pure 3,5-diethyl pyridine.

EXAMPLE 6

134 g (1 mol) of 1,1,1-trimethylol propane, 360 g. (4 mols) of 50 percent by weight aqueous dimethylamine and 100 g of concentrated hydrochloride acid are heated for 10 hours at 290°C in an autoclave. The reaction mixture is then made alkaline with 180 g. of 50 percent by weight sodium hydroxide solution, and steam-distilled at a bath temperature of 140°C. After the upper layer has been dried over potassium hydroxide the crude yield comprises 49 g. Distillation gives 29 g (42 percent of the theoretical) of pure 3,5-diethyl pyridine, B.p.$_{0.1}$: 33° – 35°C.

EXAMPLE 7

600 g (5 mols) of 1,1,1-trimethylol ethane, 200 g. of water and 200 g of ammonium chloride are introduced into an autoclave (VA-steel), followed by the introduction under pressure of 255 g of ammonia (15 mols). After reaction for 10 hours at 270°C, the dark two-phase mixture is subjected to steam-distillation. The distillate is saturated with sodium chloride, and the upper layer is separated and dried over potassium hydroxide. The crude yield is 134 g. The product is shown by its gas chromatogram to contain 75.7 percent of 3,5-dimethyl pyridine. The pure yield is 101 g (38 percent of the theoretical).

EXAMPLE 8

The procedure is as described in example 7, except that the reaction is carried out under anhydrous conditions in the presence of 200 g. of methanol as solvent. After the upper layer of the distillate has been dried over potassium hydroxide the crude yield comprises 184 g. The pure yield is 122 g of 3,5-dimethyl pyridine (45.7 percent of the theoretical).

EXAMPLE 9

The procedure is as described in example 8, except that the reaction is carried out in a titanium autoclave. The pure yield comprises 68.1 g (25.5 percent of the theoretical).

EXAMPLE 10

500 g of 1,1,1-trimethylol propane are dropped over 6 hours through a vertically arranged quartz tube filled with 150 cc. of 4.9 percent by weight of lead fluoride on granulated aluminum silicate (15 percent by weight of $Al_2O_3$), while at the same time 60 liters per hour of ammonia are passed through. The filling has a temperature of 350°C. The reaction product (680 g) is subjected to steam-distillation and the upper layer is dried over potassium hydroxide. The yield of 3,5-diethyl pyridine comprises 17 percent of the theoretical.

EXAMPLE 11

680 g. of pentaerythritol, 200 g. of water and 200 g of ammonium chloride are introduced into an autoclave (VA-steel), followed by the introduction under pressure of 255 g (15 mols) of ammonia. After reaction for 10 hours at 270°C. the dark single-phase reaction product is subjected to steam-distillation at a bath temperature of 140°C. The distillate is saturated with sodium chloride and the upper layer is separated and dried over potassium hydroxide. The crude yield is 90 g. The product contains 86.0 percent of 3-methylpyridine and 13.2 percent of 3,5-dimethylpyridine.

EXAMPLE 12

The procedure is as described in example 5, except that methylamine (465 g) is used instead of ammonia. Following distillation of the dried steam distillate, 3,5-diethylpyridine is obtained in a yield of 152 g (45 percent of the theoretical).

What we claim is:

1. Process for preparing dialkyl pyridine which comprises reacting a compound of the formula $$R-C(CH_2OH)_3,$$

wherein R is an alkyl radical with one to 12 carbon atoms, with at least half the equimolar quantity of a nitrogen compound selected from the group of ammonia, methylamine and dimethylamine at a temperature in the range of 180° to 600°C and recovering dialkyl pyridine.

2. Process of claim 1 wherein the reaction is carried out in the presence of a polar solvent and an acid catalyst having a pKs value with less than 6 and the ammonium and amine salts of said acids and at a temperature in the range of 240° to 400°C.

3. Process of claim 2 wherein said acids are selected from the group of sulphuric acid, hydrochloric acid, hydrobromic acid, hydriodic acid, perchloric acid, arsenic acid, pyrophosphoric acid, ammonium chloride, benzene sulphonic acid, o-aminobenzene sulphonic acid, picric acid, naphthalene sulphonic acid, o-nitrobenzoic acid, dichloracetic acid, trichloracetic acid, formic acid, lactic acid, acetic acid, trichlorophenol, oxalic acid, succinic acid, phosphoric acid and phosphorous acid.

4. Process of claim 1 wherein said compound is a 1,1,1-trimethylolalkane including those with linear and branched alkyl groups having from one to five carbon atoms.

5. Process of claim 4 wherein said 1,1,1-trimethylolalkane is selected from the group of 1,1,1-trimethylolethane; 1,1,1-trimethylol propane; pentaerythritol; 1,1,1-trimethylol butane; 1,1,1-trimethylol pentane; 1,1,1-trimethylol hexane; 1,1,1-trimethylol heptane; 1,1,1-trimethylol octane; 1,1,1-trimethyl-2-methyl propane; 1,1,1-trimethyl-2,2-dimethyl propane; 1,1,1-trimethylol-2,4,4-trimethyl butane; and 1,1,1-trimethylol-3-methyl butane.

6. Process for preparing dialkyl pyridine which comprises reacting a 1,1,1-trimethylol alkane having 1 to 12 carbon atoms with from 0.5 to 20 moles of a nitrogen compound selected from the group of ammonia, methylamine and dimethylamine at a temperature of 240° to 400°C in the presence in an acid catalyst having a pKs value of less than 6 and recovering the dialkyl pyridine reaction product.

* * * * *